(12) United States Patent
Müller et al.

(10) Patent No.: US 8,202,929 B2
(45) Date of Patent: *Jun. 19, 2012

(54) POLYMER NETWORKS

(75) Inventors: Rolf Müller, Zürich (CH); Federico Innerebner, Zürich (CH)

(73) Assignee: InnoGEL AG, Huenenberg (CH)

( * ) Notice: Subject to any disclaimer, the term of this patent is extended or adjusted under 35 U.S.C. 154(b) by 0 days.

This patent is subject to a terminal disclaimer.

(21) Appl. No.: 10/553,293

(22) PCT Filed: Apr. 15, 2004

(86) PCT No.: PCT/CH2004/000230
§ 371 (c)(1),
(2), (4) Date: Nov. 18, 2005

(87) PCT Pub. No.: WO2004/092280
PCT Pub. Date: Oct. 28, 2004

(65) Prior Publication Data
US 2006/0148960 A1    Jul. 6, 2006

(30) Foreign Application Priority Data
Apr. 15, 2003    (DE) .................. 103 17 418

(51) Int. Cl.
*C08J 3/22*    (2006.01)
*C08L 23/00*    (2006.01)
(52) U.S. Cl. ......... 524/487; 524/488; 524/489; 525/240
(58) Field of Classification Search .......... 524/487, 524/488, 489; 525/240
See application file for complete search history.

(56) References Cited

U.S. PATENT DOCUMENTS

| 3,522,198 A | | 10/1968 | Yamada et al. | |
| 6,033,514 A | * | 3/2000 | Davis et al. | 156/244.11 |
| 6,300,398 B1 | * | 10/2001 | Jialanella et al. | 524/275 |
| 2002/0156172 A1 | * | 10/2002 | Genetti et al. | 524/489 |
| 2003/0049474 A1 | * | 3/2003 | Su et al. | 428/515 |

FOREIGN PATENT DOCUMENTS

| EP | 0 341 188 | 11/1989 |
| EP | 0 385 599 | 9/1990 |
| EP | 0 699 710 | 3/1996 |
| UK | 849389 | 9/1960 |

OTHER PUBLICATIONS

Epolene E-20 Wax, Eastman Pulication AP-48,Sep. 1999.*
Encyclopedia of polymer Science and Technology, p. 389, online posting Oct. 2001.*
Esa Kokko,Metallocene-Catalyzed Ethene Polymerization:Long Chain Branched Polyethylene, Sep. 2002, available online. ,Introduction,p. 1.*
Polywax Polyethylene,Baker Hughes web publication.*
Basell Publication: Polyethylene :Product and properties, www. basell.com. pp. 5/5.*
U.S. Appl. No. 11/577,250, filed Oct. 2007, Muller et al.*
A.J. Peacock, Handbook of Polyethylene, Jan. 2000, Fig.1.*
Leino "Single-Site Catalysts " Article, Online Posting Oct. 22, 2001.9 Abstract and Article).*

* cited by examiner

*Primary Examiner* — James J Seidleck
*Assistant Examiner* — Gennadiy Mesh
(74) *Attorney, Agent, or Firm* — K&L Gates LLP (57) ABSTRACT

Polymer mixtures containing a first long-chain polymer and a second short-chain polymer. The structural parameters of the two polymers are coordinated in such a way that a polymeric material is obtained which is easier to process while being provided with improved mechanical properties and in part also improved thermal properties compared with the first polymer at suitable conditions for producing the polymer mixture as a result of networks being formed and heterocrystallization taking place.

33 Claims, 6 Drawing Sheets

POLYMER NETWORKS

BACKGROUND OF THE INVENTION

The present invention relates to polymer mixtures containing a first long-chain polymer and a second short-chain polymer wherein the structural parameters of the two polymers are coordinated in such a way that a polymeric material is obtained which is easier to process while being provided with improved mechanical properties and in part also improved thermal properties compared with the first polymer under suitable conditions for producing the polymer mixture as a result of networks being formed by heterocrystallisation.

SUMMARY OF THE INVENTION

The first polymer P(i) is an arbitrary synthetic polymer having a degree of polymerisation DP>500 which exhibits at least a minimal crystallinity. It can be both linear and have short- and long-chain branchings. It can be a homopolymer, a copolymer, a terpolymer or a higher polymer provided that at least one type of different monomer units is arranged at least partly in sequences. A sequence is understood here as a section of a polymer which is built up of the same monomer units and at least about 20 of such monomer units (i.e. the degree of polymerisation of repeating units of the sequences DPs is about >20), which has neither short- or long-chain branchings and the conditions for the crystallisation of such sequences are also satisfied for this section with regard to conformation. A sequence can be arranged in the main chain and/or in a side chain or can also be a side chain. When cooled from the melt, such polymers have at least a minimal crystallinity.

The second polymer P(j) is either linear or nearly linear (P(j)1) and then substantially consists of a sequence which is built up from the same monomer units as the sequences of the polymer P(i). On the other hand, the polymer P(j) can have some branchings (P(j)2) wherein the chain sections then consist of sequences built up from the same monomer units as the sequences of the polymer P(i). If P(j)1 is cooled from the melt or precipitated from a solution, crystallites are formed where the macromolecules P(j)1 present in stretched conformation usually form lamellae so that the lamella thickness is identical to the length of the macromolecules P(j)1. Since scarcely any bonds in the form of macromolecules incorporated into at least two lamellae exist between the lamellae, the cohesion of these lamellae is minimal and despite the high crystallinity, the mechanical properties of these crystal agglomerates, especially the strength and the breaking elongation are low. In the case of P(j)2, the situation relating to the sequences is comparable to P(j)1, where however as a result of the covalent linking of the sequences of P(j)2, bonds exist between the lamellae. For the sake of clarity, the invention is described hereinafter with reference to P(j)1, but the discussion can be applied similarly to P(j)2 where the conditions for P(j)1 then apply for the sequences of P(j)2. The use of second polymers of the type P(j)2 is logical insofar as the number of links between heterocrystallites can thereby be increased and in particular, fine-mesh networks can be formed. In the presence of a swelling agent, the degree of swelling can thereby be influenced, especially reduced.

The present invention describes the necessary conditions relating to the structure sizes of P(i) and P(j) as well as the conditions for preparing suitable mixtures thereof so that these two polymers can crystallise jointly under heterocrystallisation where, as a result of the very short chain length, very highly crystallisable P(j) induces crystallinity in P(i) and a network is formed whose linking points are heterocrystals of P(i) and P(j) and whose connecting elements consist of chain segments of P(i). Under suitable preparation conditions, a material can be obtained from the mixture of P(i) and P(j) which compared with P(i) has a higher crystallinity, a higher modulus of elasticity, a higher yield stress, a higher breaking elongation and even a higher melting point whereas the viscosity of the melt is significantly reduced or the MFI is significantly increased and the melt can thus be processed more easily. If the combination of P(i) and P(j) is processed in the presence of a swelling agent or subsequently swollen, gels can be obtained where the network density or the degree of swelling can be adjusted by the fraction of P(j).

The principle forming the basis of this invention is explained here for polyolefins, especially for polyethylene but can be applied similarly to further polymers where the relationship between sequence length DPs and melting point or lamella thickness are specific for the individual polymers. A detailed description for polyvinyl alcohol systems is contained in a copending patent application.

DETAILED DESCRIPTION OF THE INVENTION

P(i)

In order that effective bonds can be formed between the heterocrystallites, the degree of polymerisation DP(P(i)) is about >500, preferably >1000, more preferably >3000, most preferably >5000 where the degree of polymerisation is understood as the number of the smallest repeating unit and in polyethylene (PE) this is the unit (CH2)-. The quality of the network, especially the yield stress and the breaking elongation increases with the degree of polymerisation.

The degree of polymerisation of the crystallisable sequences of P(i), DPs(P(i)) is >20, preferably >30, more preferably >40, most preferably >50. With increasing DPs(P(i)), the crystallinity of P(i) and the melting point Tm of these crystallites increases. For PE the following correlation roughly applies. Up to DPs(P(i)) of around 150, the sequences are incorporated into the crystallites in the stretched conformation where the melting point increases with the lamella thickness L. At higher DPs(P(i)), Tm increases only minimally under the usual crystallisation conditions since folding back of the sequences takes place, that is the sequence length can be a multiple of the lamella thickness. Thus, the melting point is approximately determined with the choice of a specific sequence length.

With regard to PE, basically all types satisfying the above conditions can be used, i.e. VLDPE, LLDPE, LDPE, HDPE, HMWPE and UHMWPE as well as copolymers such as, for example, EVA or terpolymers and higher polymers. In the case of VLDPE DPs lies in the range of 7-25 so that only VLDPE with DPs >20 can appropriately be used. In the case of LLDPE, DPs lies in the range of 25-100 so that the entire spectrum can be used here. This is also the case with LDPE and HDPE. However, typical HDPE crystallises very well because of the very small fraction of side chains (only around 2 per 1000 C atoms in the chain) so that the positive effects relating to the mechanical properties which occur with the other PE are less applicable to HDPE. However, the technology can also be suitable for HDPE in order to increase its MFI and therefore the processability, or for special applications where the fraction of P(j) is very high, for example, 50% so that the melt of the mixture has a very low viscosity and is freely pourable and this mixture can be used as casting resin which hardens on cooling without any chemical cross-linking needing to take place, as is the case with the usual casting resins (e.g. polyester resins, epoxide resins).

P(j) and Suitable Combinations of P(j) with P(i)

The degree of polymerisation DP(P(j)) is >20, preferably >30, more preferably >40, most preferably >50 where the degree of polymerisation is also understood here as the number of the smallest repeating unit. The maximum degree of polymerisation DP(P(j)) is around <500. For P(j) the sequence length in cases of complete linearity, which is preferred, is identical to the degree of polymerisation. For P(j) Tm increases continuously with DP(P(j)) but the melting points have lower values than for P(i) if DPs(P(i)) is comparable to DP(P(j)), in the case of PE for example the values are around 10° C. lower. This is probably attributable to the different interfacial tensions.

Advantageous synergistic effects as a result of the heterocrystallisation of P(i) and P(j) occur especially if DPs(P(i)) is approximately comparable to DP(P(j)), i.e., preferably $0.1 \times DP(P(j)) < DPs(P(i)) < 10 \times DP(P(j))$, more preferably $0.3 \times DP(P(j)) < DPs(P(i)) < 7 \times DP(P(j))$, most preferably $0.5 \times DP(P(j)) < DPs(P(i)) < 5 \times DP(P(j))$. An exception is found, for example, for casting resins where DPs(P(i)) can still be very much greater than DP(P(j)).

On the one hand, a lower DP(j) is advantageous since the mobility of the macromolecules and therefore the rate of crystallisation and the degree of crystallisation increase with decreasing molecular weight. Combined with the slow crystallising P(i), the crystallisation behaviour of P(j) to P(i) is induced. It was astonishingly found that if Tm(P(i))>Tm(P(j)), the heterocrystallites then have a melting point around Tm(P(i)), i.e. the advantage of the high rate of crystallisation and the high degree of crystallisation of P(j) is then combined with the advantage of the higher melting point of P(i). Conversely, if Tm(P(i))<Tm(P(j)), a heterocrystallite melting point around Tm(Pj) can be obtained, i.e. the heterocrystallites then approximately have the melting point of the higher-melting component. Thus, Tm(P(i)) can be increased by a fraction of P(j).

P(j) is used relative to P(i) and P(j) in fractions in wt. % in the range of about 1-50, preferably 2-40, more preferably 3-30, most preferably 4-25. In the case of freely pourable casting resins, the fraction is approximately in the range of 10-95, preferably 15-90, more preferably 20-85, most preferably 25-80.

In an embodiment of the polymer mixture, under comparable processing conditions of P(i) and of P(i)+P(j), a) the quotient of the modulus of elasticity E(i, j) of P(i) +P(j) and the modulus of elasticity E(i) of P(i), E(i, j)/E(i) is >1.1 and <4; and/or b) the quotient of the yield stress sy(i, j) of P(i)+P(j) and the yield stress sy(i) of P(i), sy(i, j)/sy(i) is >1.1 and <3.0; and optionally; c) if there is a fraction A(j) of P(j) relative to P(i)+P(j) in wt. % within the range 1<A(j)<15, the quotient of the breaking elongation eb(i, j) of P(i)+P(j) and the breaking elongation eb(i) of P(i), eb(i, j)/eb(i) is >1.01 and <1.5.

Mixing Method

A necessary condition so that P(i) and P(j) can form advantageous networks under heterocrystallisation is the preparation of a melt where the components are present in a molecularly dispersed distribution. Since P(i) and P(j) usually have extremely different viscosities in the molten state, where P(i) typically forms a highly viscous thermoplastic melt and P(j) is present with a viscosity of the order of magnitude of water, it is difficult to prepare a molecularly dispersed mixture of these components. If the mixing is insufficient, the advantages of the combination of P(i) and P(j) are only partly retained or are not retained at all, in particular separate phases are formed, as a result of which the breaking elongation for example is massively reduced.

The polymers P(i) and P(j) are typically present as powder or granules. If these components are supplied to thermoplastic processing, for example, by means of extrusion, P(j) usually melts first and thin-liquid fluid, comparable to molten candle wax is formed. On the other hand, P(i) also requires shear forces for the melting process where mechanical energy is converted into thermal energy and a highly viscous thermoplastic melt is thus obtained. If P(i) and P(j) are supplied to the mixing process together, the thin-liquid P(j) forms a film around the granule grains or the powder particles of P(i) as a result of which scarcely any more shear forces can be transferred to P(i). This problem is more marked when using granules than with powder and in both cases, increases with the fraction of P(j). In order to achieve sufficient mixing despite this, long mixing times are required and special extruder configurations need to be used, e.g. double-screw extruders with kneading blocks and/or return elements. A sufficiently molecularly dispersed mixture cannot be achieved using simple single-screw extruders such as forming extruders for example, which are sufficient for the usual plasticization processes and are not fitted with special mixing parts. However, even with specially designed extruders, the mixing of P(i) and P(j) is problematical, especially with high fractions of P(j). It is then advantageous to first plasticise P(i) separately, at least partly and supply P(j) to the already existing melt of P(i) or to supply P(j) in stages, for example, a first fraction together with P(i) and then a second fraction to the first melt of P(i) and the first fraction of P(j), where the viscosity of the first melt is already severely reduced as a result compared with a melt of P(i) and the incorporation of the second, typically larger, fraction is made easier.

A further processing possibility consists in preparing from P(i) and P(j) on a specially equipped mixer a master batch having a high fraction of P(j) which is then granulated for example. These granules (or powder) can then be simply processed together with granules or powder of P(i) since the viscosity of the master batch of the material is very much closer to the viscosity of P(i) than to P(j).

EXAMPLES

Preparation of Polymer Mixtures
Brabender Chamber Kneader

The polymer P(i) was first plasticised at a chamber temperature of 170° C. and then the polymer P(j) was added to the melt of P(i) over a period of about 2 min. The speed was 100 rpm and the total mixing time was varied between 5 and 10 min. The mass temperatures were in the range of 170-195° C., with increasingly lower mass temperatures being achieved with increasing fraction of P(j).

The mixture was pressed into 0.5 mm films in a plate press at 180° C., left at this temperature for 5 min after which the press was cooled rapidly with a maximum throughput of cooling water.

Double-Screw Extruder

In FIGS. 8-11 discussed below, the reference numerals 1 through 8 refer to the following:
1) Preparation extruder;
2) Solid dosing device for P(i);
3) Solid dosing device for P(j);
4) Extrusion nozzle;
5) Second solid dosing device for P(j);
6) Pre-compound or master batch of P(i) and P(j);
7) Single-screw extruder; and
8) Solid dosing device for a powder mixture of P(i) and P(j).

Figure 8:
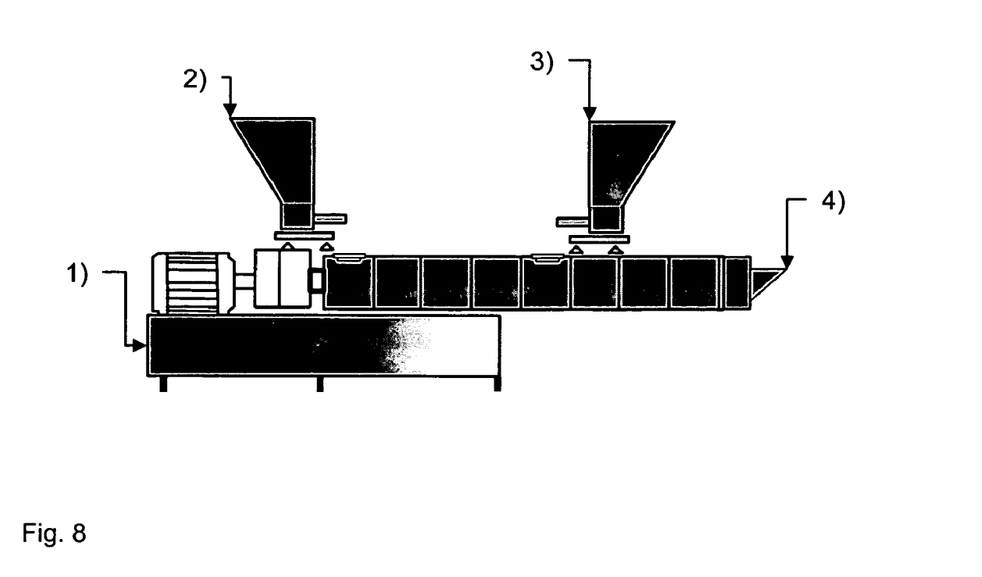
FIGS. 8 through 10 illustrate three embodiments of double-screw extruders for mixing P(i) and P(j)
Figure 9:
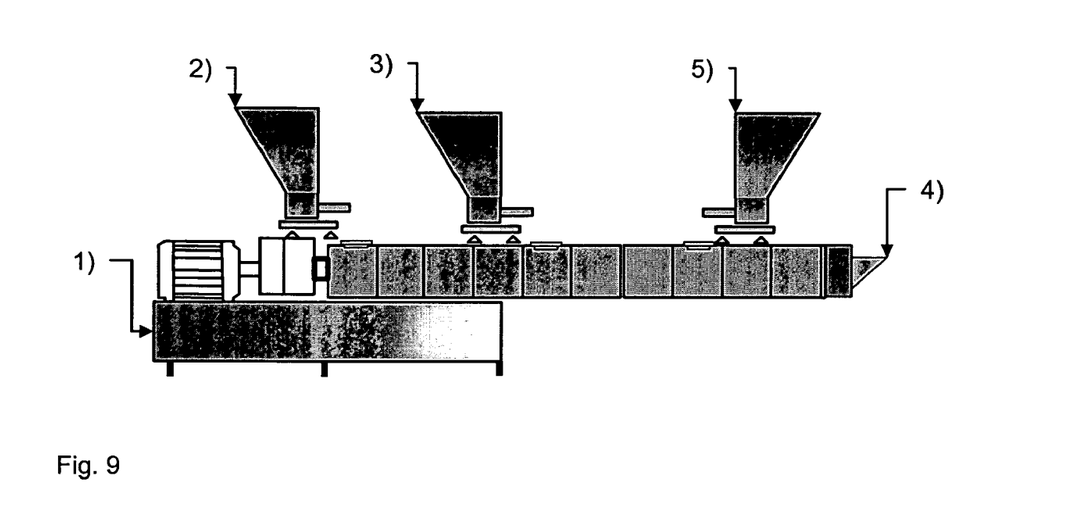
Figure 10:
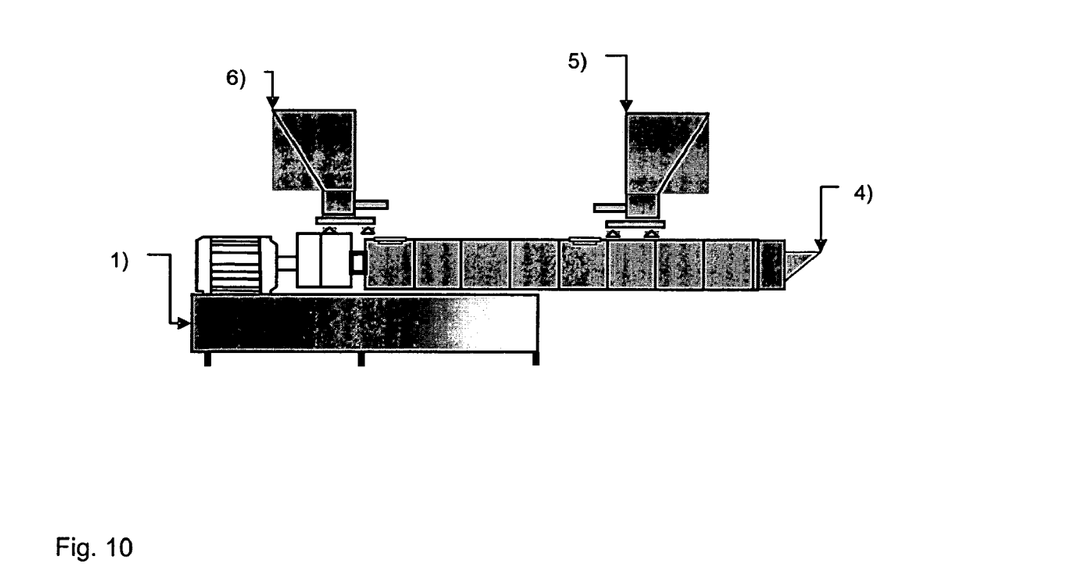

A 30 mm co-rotational close-combing double-screw extruder with 36L/D was used with an extrusion nozzle (see FIG. 8). The housing temperatures were G1=60° C. (feed zone for P(i)), G2=150° C. (feed zone for P(i)), G3–G4=180° C. (melting zone), G5=180° C. (feed zone for P(j)), G6–G7=180 (mixing zone), G8=180° C. (discharge zone), nozzle=185° C., the speed was 300 rpm. P(i) was added as granules and a homogeneous melt of P(i) was present from G4. In the housing 5 the polymer P(j) was added in the form of granules which melted rapidly and in G6–G7 were mixed with P(i) to form a homogeneous melt. The addition of P(j) in powder form caused no significant change in the product properties, likewise the addition of P(j) in the already molten state. For the preparation of a 7% mixture, the dosing rates were 22 kg/h for P(i) and 1.655 kg/h for P(j). The melt obtained was shaped to pressure plates as described in the Brabender method. Also studied was the granulation of the strand which was then cooled over a water bath and could be granulated using a strand granulating device. The melt was then shaped into strips using a slotted nozzle. Overall homogeneous molecularly dispersed mixtures with up to a 30% fraction of P(j) could be obtained relatively simply. In the case of higher fractions of P(j), the dosed addition of P(j) was split (see FIG. 9). In this case, a first part of P(j) was mixed homogeneously with P(i) and then the second part of P(j) was added to this mixture and thus mixed homogeneously. By reducing the viscosity of the melt after the first mixing process, the second mixing process was made significantly easier. Alternatively thereto, a first mixture was prepared in a first step and granulated to form a pre-compound or master batch (see FIG. 10) whereafter this pre-compound was plasticised again in a second step and a second fraction of P(j) was added. High fractions of P(j) could also be obtained with this process variant, such as is especially required for the preparation of (low-viscosity) casting resins.

Single-Screw Extruder

Figure 11:
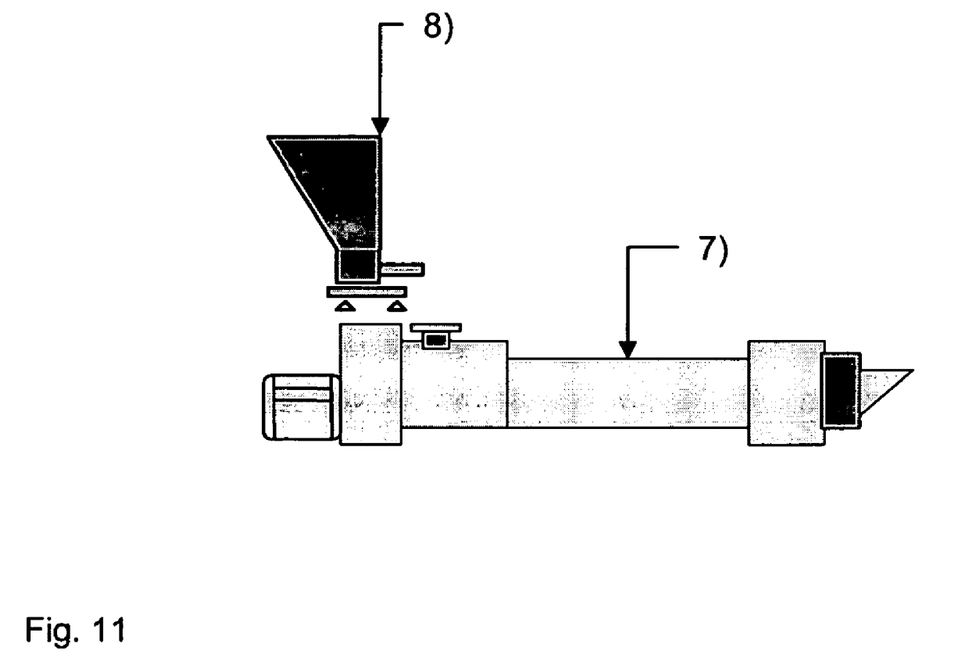
FIG. 11 illustrates a single screw extender for mixing P(i) and P(j).

A 40 mm single-screw (forming extruder) was used (see FIG. 11). The feed zone was at room temperature, the other zones were at 180° C. and the speed was 250 rpm. The polymers P(i) and P(j) were preliminarily mixed in powder form using a drum mixer and this mixture was then metered at 12.4 kg/h. The components are melted and mixed over the metering and mixing zone. The melt was obtained as a strand by means of a hole-type nozzle and pressed into films as described in the Brabender method. The properties of the products were significantly inferior to those obtained using a double-screw extruder. When using a single-screw extruder with a metering and mixing section, the results were approximately comparable to the products obtained using the Brabender method with a longer mixing time.

Analyses

An Instron tensile tester 4500 was used to analyse the mechanical properties. The samples were punched from films. The measuring length was 13 mm, the width 2 mm and the strain rate 100 mm/min. The melting points were determined using a Perkin-Elmer 7 DSC for film samples as peak temperatures during a first heating process, the heating rate was 20° C./min.

Properties of the Polymer Mixtures

Figure 1:
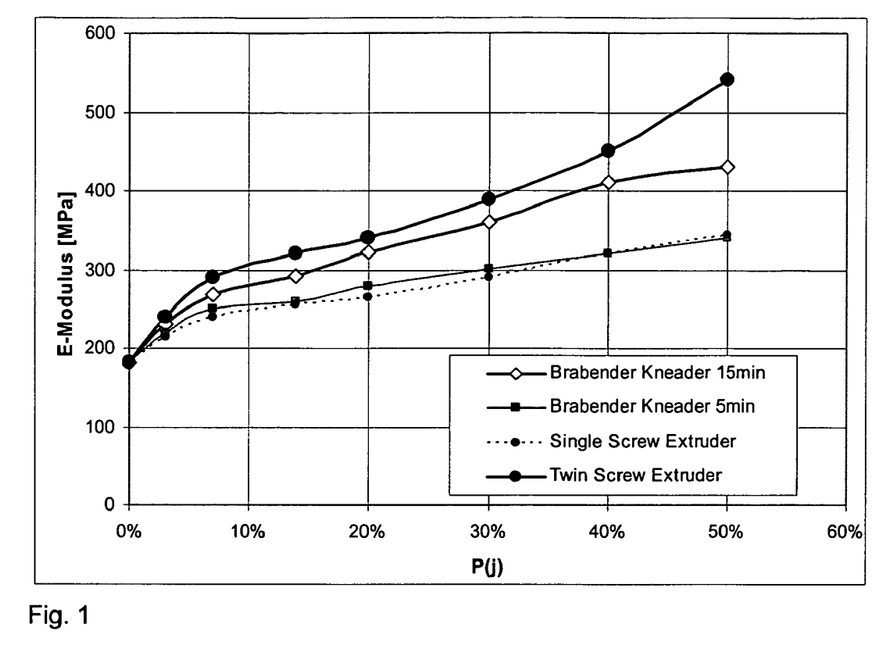
FIG. 1 is a graph of the moduli of elasticity mixtures of a first polymer P(i) and a second polymer P(j) as a function of the second polymer P(j)

FIG. 1 gives the moduli of elasticity as a function of the fraction of P(j) (PE wax with a molecular weight of 500 and a polydispersivity P of 1.1) for LDPE (P(i)) having a density of 0.917 g/cm$^3$ for the various mixing methods. In all cases, an increase in the modulus of elasticity with the fraction of P(j) can be determined, this increase being significantly more marked when the polymer mixture is prepared using a double-screw extruder with a mixing section compared with the other mixing methods. If the mixture is prepared using a Brabender kneader, a clear dependence on the mixing time can be determined. After a mixing time of 15 min, comparatively high moduli of elasticity are obtained whereas after a mixing time of 5 min, the moduli of elasticity are significantly lower and comparable to the moduli of elasticity when extrusion is performed using a single-screw extruder. These differences in the modulus of elasticity and the other mechanical properties are attributable to the more or less marked homogeneity of the mixture of P(i) and P(j) and clearly show the influence of the mixing method used. A further advantage when using a double-screw extruder is that the typical mixing times of 0.5-3 min are relatively short and thus the influence of thermal degradation is minimal. The difference between the mechanical properties and those of mixtures prepared using a Brabender kneader during a mixing time of 15 min must be at least partly attributable to the thermal degradation during the long mixing time.

Figure 2:
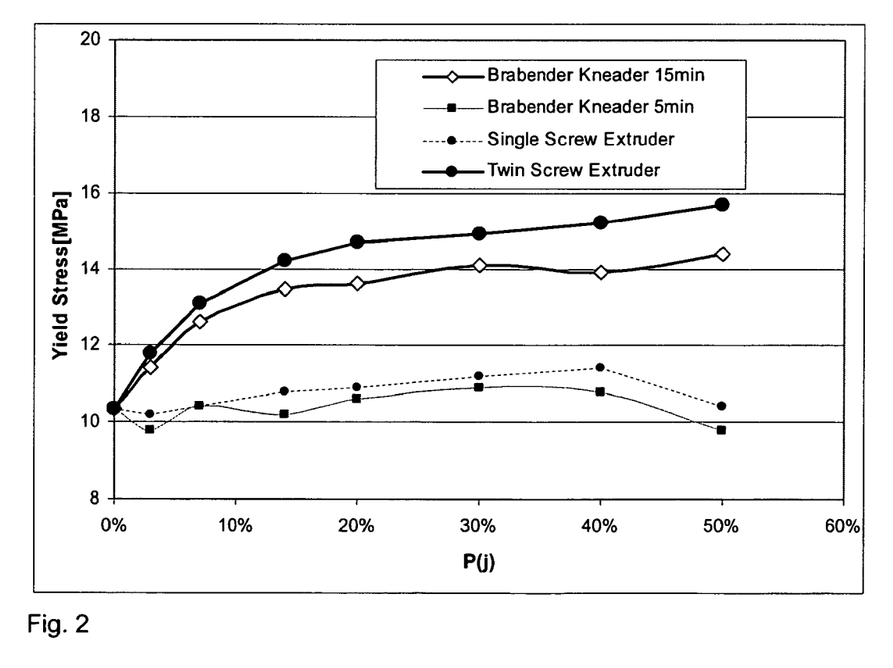
FIG. 2 is a graph of the yield stresses of mixtures of P(i) and P(j) as a function of P(j)

FIG. 2 shows the yield stresses for the various prepared mixtures. This parameter is clearly more markedly dependent on the mixing method used. After preparing the mixture using a double-screw extruder and somewhat less markedly after preparation using a Brabender kneader with a mixing time of 15 min, a marked increase in the yield stress can be identified whereas this effect is comparatively small with other mixing methods.

Figure 3:
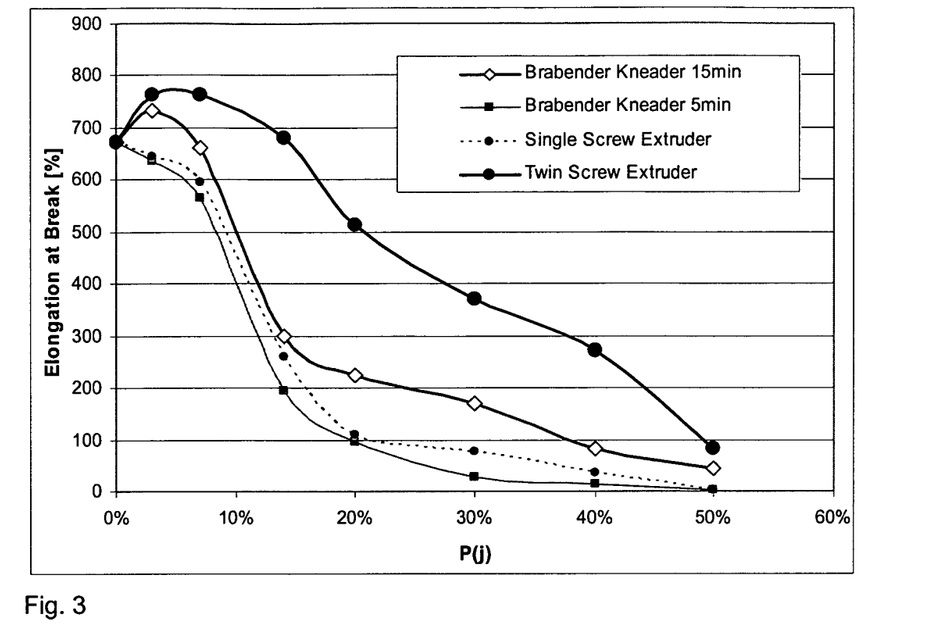
FIG. 3 is a graph of the elongation at break of mixture of P(i) and P(j) as a function of P(j)

FIG. 3 shows the breaking elongations of the various prepared mixtures. In the better mixing methods an increase in the breaking elongation was surprisingly found with the fraction of P(j). This is astonishing since an increase in the modulus of elasticity and the yield stress is usually associated with a reduction of the breaking elongation. This effect is probably attributable to the fact that the heterocrystallites are formed with a highly dispersed distribution from a molecularly dispersed mixture of P(i) and P(j) and are well cross-linked among one another, a fine-grained structure is present in relation to the crystalline and amorphous phases and no phase separation of P(i) and P(j) exists. The advantage of preparing the mixture using a double-screw extruder becomes particularly clear from the behaviour of the breaking elongation of the mixture.

Further similar tests were carried out using a selection of different PE waxes and paraffins, where basically similar behaviour could be observed but the influence on MFI and the mechanical and thermal properties was dependent on the individual wax. Similar modifications of the property profile were also obtained for other PE and PP (polypropylene wax was used here).

Figure 4:
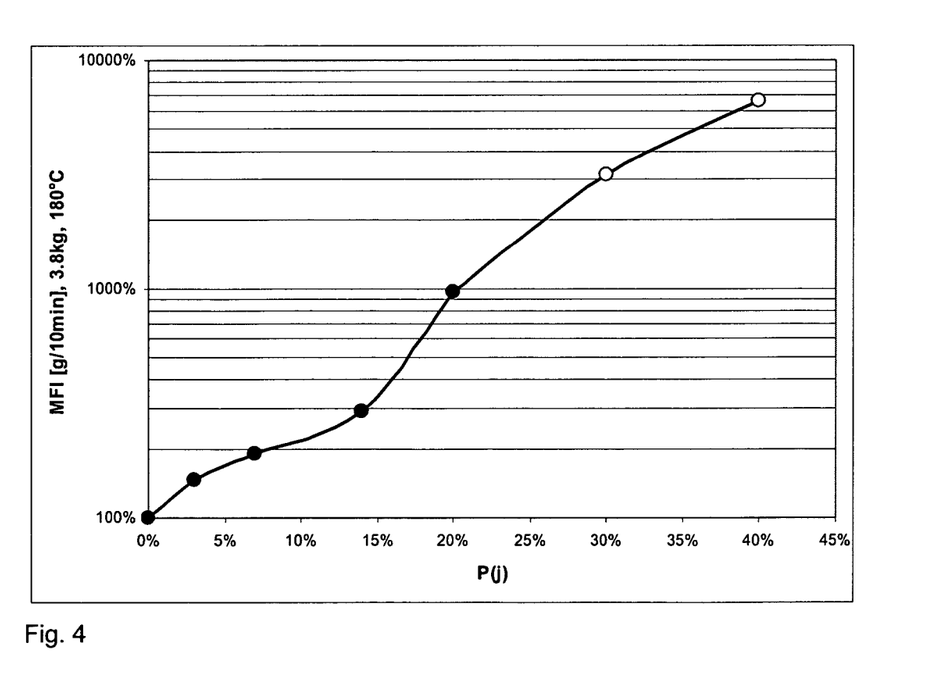
FIG. 4 is a graph of MFI as a function of P(j)

FIG. 4 shows the influence of P(j) (PE wax with a molecular weight of 500 and a polydispersivity P of 1.1) on the MFI of P(i) (LDPE). The type of preparation of the polymer mixture is of less importance with regard to the MFI and comparable results were obtained in each case. The measured values for P(j)=30 and 40% were measured at a weight of 1 kg and converted to 3.8 kg, they are thus only approximate values. It was particularly difficult to measure the MFI for P(j)=40% since the mixture of P(i) and P(j) had a viscosity almost in the range of water at 180° C. The MFI is not a suitable method of characterisation for such mixtures but it can nevertheless be shown that the MFI increases by orders of magnitude, by a factor of about 70 for P(j)=40%. Thus, freely pourable resins can be obtained. The increase in the MFI however is already substantial for small fractions of P(j). For P(j)=3% the MFI increases by a factor of 1.5, for P(j)=7% by a factor of around 2. A new degree of freedom can thereby be obtained in the processing of polymers, especially polymers having high molecular weight and correspondingly high viscosity, corresponding to a low MFI, i.e., a high-molecular melt P(i) can be processed by adding P(j) having a viscosity of a melt of significantly lower molecular weight whereby the melting point, for example, can be better controlled, especially can be reduced and shorter process times are possible, for example during injection moulding where lower pressures can also be used. Thus, a polymer P(i) having a high or very high molecular weight can be processed under conditions typical of a similar polymer having a significantly lower molecular weight whilst the advantageous mechanical properties in the end product of the polymer having high or very high molecular weight are retained or even improved (see FIGS. 1 to 3).

Figure 5:
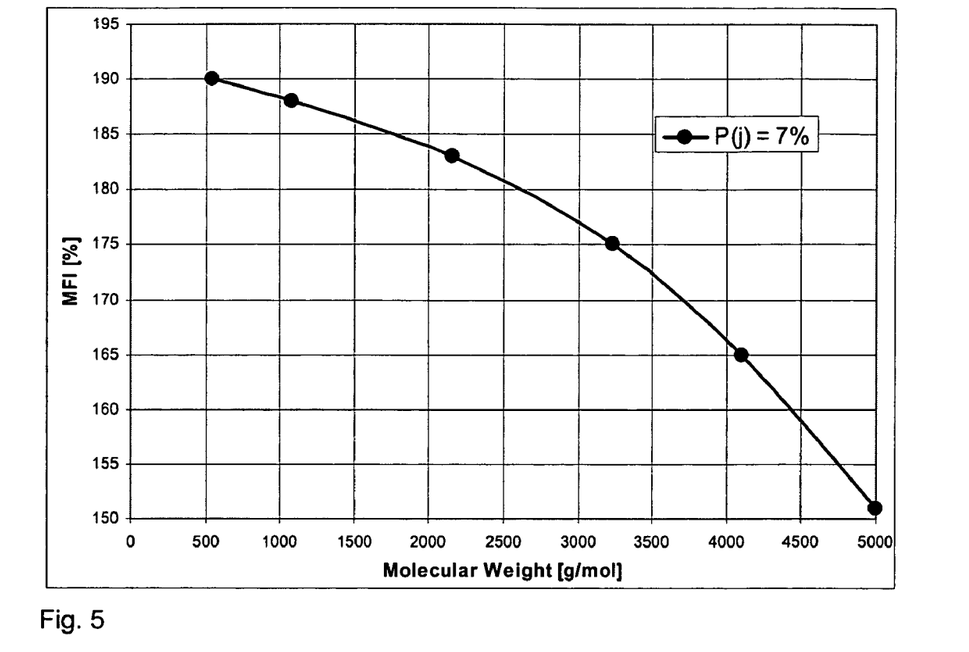
FIG. 5 is a graph of the influence of molecular weight on MFI.

FIG. 5 shows the influence of the molecular weight on the increase in the MFI [g/10 min] measured at 3.8 kg and 180° C. with a P(j) fraction of 7%. The measured values were obtained for LDPE (P(i) and PE wax (P(j)) with polydispersivities of around 1.1, i.e. for an almost monodisperse molecular weight distribution. As the molecular weight of P(j) decreases, a substantial increase in the MFI can be observed. Many PE waxes and paraffins have a relatively broad molecular weight distribution with polydispersitivities up to around 20, their influence on the MFI is approximately comparable to the relationship in FIG. 5 if the weight average (ideally the viscosity average) is used for the molecular weight. Whereas the influence of the molecular weight of P(j) on the MFI is very marked, the mechanical properties for polymer mixtures containing PE wax having a low dispersivity are only comparatively slightly influenced by the molecular weight of this wax, almost no influence of the molecular weight can be identified with a P(j) fraction of 7% and molecular weights up to around 2000, and the modulus of elasticity, yield stress and breaking elongation only increase further above 2000. With higher fractions of PE waxes, higher molecular weights are increasingly advantageous which can probably be attributed to the fact that as a result of the higher molecular weight, phase separation of P(i) and P(j) is more difficult as the melt solidifies. This relationship also applies to other waxes such as paraffins.

Figure 6:
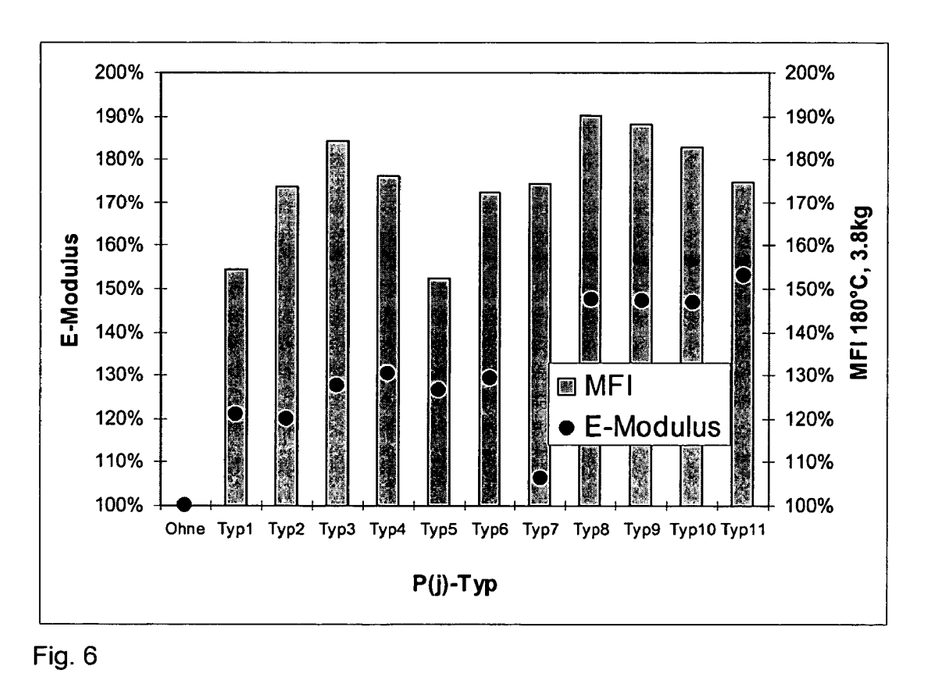
FIG. 6 is a graph showing the influence of a spectrum of various types of PE waxes and paraffins on MFI and the modules of elasticity.

FIG. 6 shows the influence of a spectrum of various types of PE waxes and paraffins on MFI and the modulus of elasticity of LLDPE having a density of 0.92 g/cm³. The corresponding mixtures were obtained with P(j)=7% using a Brabender kneader with a mixing time of 10 min, i.e., the absolute values of the modulus of elasticity are typically higher for the extrusion of mixtures but a comparison of the effects of the various types is also quite possible under these conditions.

Figure 7:
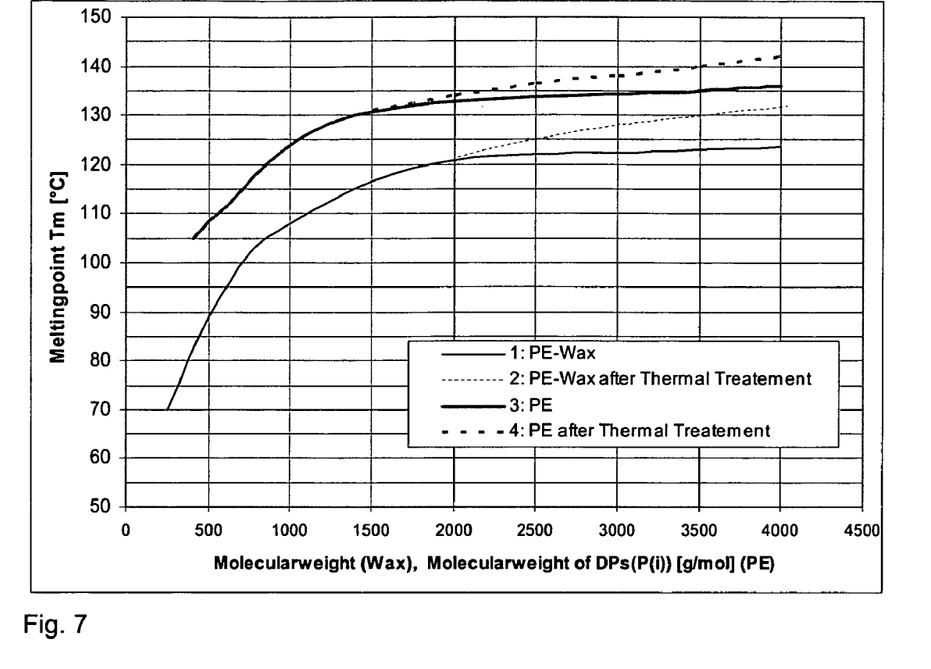
FIG. 7 shows the melting point of PE wax as a function of molecular weight.

The types studied had molecular weights in the range of 300-7000 g/mol with very broad molecular weight distributions in some cases, densities in the range of 0.89-0.99 g/cm³, melting points in the range of 50-132° C. (waxes can also have different melting points) and viscosities at temperatures of 140-150° C. in the range of 6-30,000 cP. The influence of the molecular weight of the polymer P(j) on the MFI has already been mentioned and the influence of the viscosity is similar. For the same P(j) the influence on the relative increase in the MFI for various P(i) such as HDPE, LDPE, LLDPE, VLDPE, EVA, PP etc. is comparable. With regard to the mechanical properties however, in some cases there are major differences in the effect of different P(j) for the same P(i) as well as in the effect of an individual P(j) for different P(i). An investigation of the basic relationships revealed the following tendencies although deviations therefrom and exceptions can always occur and the processing and crystallisation conditions also play a role. A high density of P(j) especially correlates with the melting point when the molecular weight distribution of P(j) is narrow and results in a significantly increased crystallinity of the mixture with P(i), as a result of which the modulus of elasticity and yield stress increase and astonishingly, this is also the case with a broad molecular weight distribution although the effect is usually less strongly defined which is why molecular weight distributions having polydispersivities <20, especially <15, most preferably <10 are preferred. The molecular weight distribution is frequently not known for waxes but is reflected in the width of the melting or softening range where narrower intervals are preferred. In the combination of a P(j) with different P(i), the ratio of the degree of polymerisation of the sequence length of P(i), DPs(P(i)) to the degree of polymerisation of P(j), DP(P(j)), for example, or equivalent to this, the ratio of the molecular weight of the sequence length of P(i) to the molecular weight of P(j) is a central parameter as well as the width of the distributions of DPs (P (i)) and DP(P(j)). If DPs(P(i)) and DP(P(j)) are monodisperse and identical, the conditions for an advantageous heterocrystallisation are clearly given, likewise if the polydispersivities are similar, as long as the polydispersivity is not too high. If $1<Q<10$ where $Q=DPs(P(i))/DP(P(j))$, heterocrystallisation can likewise take place, where the melting point of the heterocrystallites approximately corresponds to the melting point of P(i), i.e., the heterocrystallites can also have a very much higher melting point than P(j), the difference can be 30 or 40° C. or more. When $Q>10$, heterocrystallisation is still possible but the tendency towards phase separation increases, especially with larger fractions of P(j). The phase separation can be at least partially suppressed by a high cooling rate but can optionally still take place at room temperature, especially with high fractions of P(j) and low molecular weights of P(j), which is why paraffins having high very short-chain fractions are disadvantageous. Of particular interest are values of $Q<1$. In this case, P(j) forms crystallites of larger lamella thickness than P(i) where the longer-chain sequences of the sequence length distribution of P(i) preferably form heterocrystallites with P(j). The melting point of P(i) is thereby increased since the melting point Tm increases with the lamella thickness. FIG. 7 shows the melting points for PE wax as a function of the molecular weight and the melting points for PE as a function of the molecular weight of the sequences of PE. From this it is possible to read off the conditions under which the melting point of PE can be increased by adding P(j).

The invention claimed is:

1. A polymer mixture consisting of:
   at least one synthetic first polymer P(i) and between 3% to 14% by weight of at least one second polymer P(j),
   wherein the first polymer P(i) has a degree of polymerisation DP(P(i))>500 and at least one type of crystallisable sequences A having a degree of polymerisation DPs(P(i)) of these sequences >20,
   wherein the second polymer P(j) is made up of the same monomer units as the sequences A of P(i) and the degree of polymerisation DP(P(j)) of P(j) is 20<DP(P(j))<500,
   wherein the polymer mixture comprises a molecularly dispersed mixture containing P(i) and P(j) that forms a network by heterocrystallisation,
   wherein P(i), or the sequences A of P(i), comprises a polyethylene,
   wherein P(j) has a polydispersivity <30 and is a polyethylene wax; and
   wherein P(i) has a degree of branching <3×10$^{-2}$, and P(j) has a degree of branching <5×10$^{-2}$, wherein the first polymer P(i) and the second polymer P(j) have been mixed together using a twin screw extruder, and wherein the polymer mixture of the first polymer P(i) and the second polymer P(j) has an elongation at break greater than an elongation at break of the first polymer P(i) alone.

2. The polymer mixture according to claim 1, wherein under comparable processing conditions of P(i) and of P(i)+P(j) the quotient of the yield stress sy(i, j) of P(i)+P(j) and the yield stress sy(i) of P(i), sy(i, j)/sy(i) is >1.1 and <3.0.

3. The polymer mixtures according to claim 2, wherein E(i,j) is >1.3, sy(i, j) is >1.2 and eb (i,j) is >1.03.

4. The polymer mixtures according to claim 2, wherein E(i,j) is >1.5, sy(i, j) is >1.3 and eb (i,j) is >1.05.

5. The polymer mixtures according to claim 2, wherein E(i,j) is >2.0, sy(i, j) is >1.5 and eb (i,j) is >1.10.

6. The polymer mixture according to claim 1, wherein a quotient of the MFI(i, j) of the mixture of P(i)+P(j) and the MFI(i) of P(i), MFI(i, j)/MFI(i) is >1.2 and <500.

7. The polymer mixture according to claim 6, wherein the quotient of MFI(i, j) and MFI(i) is >1.5.

8. The polymer mixture according to claim 6, wherein the quotient of MFI(i, j) and MFI(i) is >2.0.

9. The polymer mixture according to claim 6, wherein the quotient of MFI(i, j) and MFI(i) is >3.0.

10. The polymer mixture according to claim 1, wherein under comparable processing conditions of P(i) and of P(i)+P(j), the quotient of the crystallinity K(i, j) of P(i)+P(j) and the crystallinity K(i) of P(i), K(i, j)/K(i) is >1.03 and <3.

11. The polymer mixture according to claim 10, wherein the quotient of K(i, j) and K(i) is >1.05.

12. The polymer mixture according to claim 10, wherein the quotient of K(i, j) and K(i) is >1.1.

13. The polymer mixture according to claim 10, wherein the quotient of K(i, j) and K(i) is >1.2.

14. The polymer mixture according to claim 1, wherein P(i) has a degree of branching <1×10$^{-2}$, and P(j) has a degree of branching <1×10$^{-3}$.

15. The polymer mixture according to claim 1, wherein P(i) has a degree of branching <5×10$^{-3}$, and P(j) has a degree of branching <1×10$^{-3}$.

16. The polymer mixture according to claim 1, wherein P(i) has a degree of branching <1×10$^{-3}$, and P(j) has a degree of branching <1×10$^{-4}$.

17. The polymer mixture according to claim 1, wherein P(j) has a polydispersivity <20.

18. The polymer mixture according to claim 1, wherein P(j) has a polydispersivity <10.

19. The polymer mixture according to claim 1, wherein P(j) has a polydispersivity <5.

20. The polymer mixture according to claim 1, wherein P(i) and/or P(j) have long-chain branchings which have a degree of polymerisation >20.

21. The polymer mixture according to claim 1, wherein P(i) and/or P(j) have long-chain branchings which have a degree of polymerisation >30.

22. The polymer mixture according to claim 1, wherein P(i) and/or P(j) have long-chain branchings which have a degree of polymerisation >40.

23. The polymer mixture according to claim 1, wherein P(i) and/or P(j) have long-chain branchings which have a degree of polymerisation >50.

24. The polymer mixture according to claim 1, wherein P(j) has a density in g/cm$^3$ of >0.9, and a melting or dropping point in ° C. of >80.

25. The polymer mixture according to claim 1, wherein P(j) has a density in g/cm$^3$ of >0.925, and a melting or dropping point in ° C. of >100.

26. The polymer mixture according to claim 1, wherein P(j) has a density in g/cm$^3$ of >0.950, and a melting or dropping point in ° C. of >110.

27. The polymer mixture according to claim 1, wherein P(j) has a density in g/cm$^3$ of >0.970, and a melting or dropping point in ° C. of >120.

28. The polymer mixture according to claim 1, wherein P(j) has a density in g/cm$^3$ of >0.980, and a melting or dropping point in ° C. of >125.

29. The polymer mixture according to claim 1, wherein the polymer mixture after preparation is present in the form selected from the group consisting of granules, pellets, powder, macro- or micro-fibres, films, continuous casting, casting, extrudate, thermo-shaped part and combinations thereof.

30. The polymer mixture according to claim 2, wherein, if there is a fraction A(j) of P(j) relative to P(i)+P(j) in wt.% within the range 1 <A(j)<15, the quotient of the elongation at break eb(i, j) of P(i)+P(j) and the elongation at break eb(i) of P(i), eb(i, j)/eb(i) is >1.01 and <1.5.

31. The polymer mixture according to claim 1, wherein 0.5×DP(P(j))<DPs(P(i))<5×DP(P(j)).

32. The polymer mixture according to claim 1, wherein 0.3×DP(P(j))<DPs(P(i))<7×DP(P(j)).

33. A polymer mixture consisting of:
   at least one synthetic first polymer P(i) and between 3% to 14% by weight of at least one second polymer P(j),
   wherein the first polymer P(i) has a degree of polymerisation DP(P(i))>500 and at least one type of crystallisable sequences A having a degree of polymerisation DPs(P(i)) of these sequences >20,
   wherein the second polymer P(j) is made up of the same monomer units as the sequences A of P(i) and the degree of polymerisation DP(P(j)) of P(j) is 20<DP(P(j))<500,
   wherein the polymer mixture comprises a molecularly dispersed mixture containing P(i) and P(j) that forms a network by heterocrystallisation,
   wherein P(i), or the sequences A of P(i), comprises a polypropylene,
   wherein P(j) has a polydispersivity <30 and is a polypropylene wax; and
   wherein P(i) has a degree of branching <3×10$^{-2}$, and P(j) has a degree of branching <5×10$^{-2}$, wherein the first polymer P(i) and the second polymer P(j) have been mixed together using a twin screw extruder, and wherein the polymer mixture of the first polymer P(i) and the second polymer P(j) has an elongation at break greater than an elongation at break of the first polymer P(i) alone.

* * * * *